No. 799,528. PATENTED SEPT. 12, 1905.
W. L. BLISS.
TRAIN LIGHTING SYSTEM.
APPLICATION FILED APR. 24, 1905.
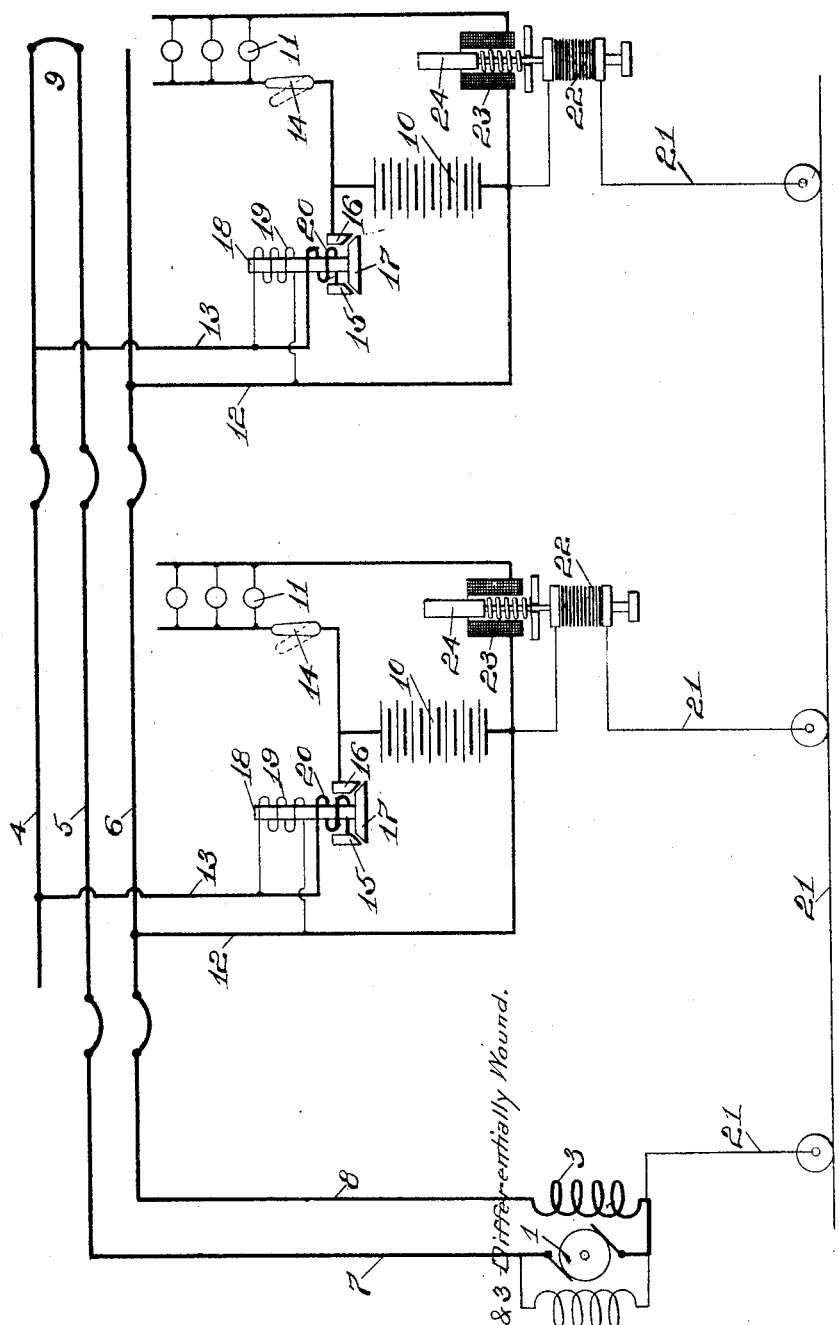
WITNESSES:
Herbert J. Smith
J. L. Robertson
INVENTOR:
William L. Bliss
BY:
Edwin B. H. Tower, Jr.
ATTORNEY.

UNITED STATES PATENT OFFICE.

WILLIAM L. BLISS, OF BROOKLYN, NEW YORK, ASSIGNOR TO BLISS ELECTRIC CAR LIGHTING COMPANY, OF MILWAUKEE, WISCONSIN, A CORPORATION OF WISCONSIN.

TRAIN-LIGHTING SYSTEM.

No. 799,528.     Specification of Letters Patent.     Patented Sept. 12, 1905.

Application filed April 24, 1905. Serial No. 257,142.

*To all whom it may concern:*

Be it known that I, WILLIAM L. BLISS, a citizen of the United States, residing at Brooklyn, in the county of Kings and State of New York, have invented new and useful Improvements in Train-Lighting Systems, of which the following is a full, clear, concise, and exact description, reference being had to the accompanying drawing, forming a part of this specification.

The present invention relates to improvements in lighting systems which are especially adapted to be employed for lighting cars or other units of transportation by electricity.

The particular form of system to which the present invention relates is especially adapted to be employed for lighting a train of cars. Each car in the train is equipped with a storage battery and lamps, and a single generator, which is driven by an axle or similar means, furnishes current to all of the cars.

The present application sets forth and claims a modification of an invention which is disclosed in an application filed by me June 16, 1904, Serial No. 212,835.

According to the present invention the generator is provided with a field-winding which is arranged in circuit to regulate the same to confine the output thereof within prearranged limits notwithstanding its wide variations in speed.

It is the object of the present invention to provide means which will prevent the regulation of the generator from being altered upon such changes in the current as result from changes in the number of cars in the train and in the number of lamps in operation.

The accompanying drawing illustrates a system which will be explained for the purpose of disclosing the present invention. It will of course be understood that the system illustrated in said drawing may be changed in many ways without departing from the invention, and, furthermore, that the drawing illustrates merely sufficient features of the system to disclose the invention.

The generator which furnishes the current for lighting the cars is preferably arranged upon the tender of the locomotive; but it may be located elsewhere upon the train. It is preferably provided with an armature 1, which is geared to an axle. It is also preferably provided with a shunt field-winding 2 and a differential series field-winding 3. The shunt field-winding preferably produces the initial excitation of the field of the generator. The series field-winding serves to regulate the generator to confine the output thereof within safe limits. It is arranged to oppose the shunt field-winding, and its action is always predominated by that of the shunt field-winding. Upon an increase in the speed of the armature the current in the series field-winding 3 will increase, thereby causing the strength of the field of the generator to decrease, and likewise upon a decrease in the speed of the armature the current in the said field-winding will decrease, thereby causing the strength of the field of the generator to increase. The resultant strength of the series field-winding 3 and the shunt field-winding 2 being thus varied inversely as the speed of the armature 1 varies, the generator will be regulated to confine the output thereof within prearranged limits notwithstanding the wide variations in speed to which it is subjected.

Throughout the train may extend a train-line which is preferably composed of conductors 4, 5, and 6. The conductors 5 and 6 are preferably connected to the generator at the forward end of the train by supply-mains 7 and 8, and the conductors 4 and 5 are preferably connected to each other at the rear end of the train by a jumper 9.

The equipment which is provided for each car will now be explained. The drawing illustrates equipments for two cars, and as both equipments are alike reference will be made to a single car in explaining the same.

Each car preferably carries a storage battery 10 and lamps 11. The storage battery and the lamps are connected to a local circuit composed of conductors 12 and 13, said storage battery being arranged in one parallel branch of said circuit and said lamps in another. The conductors 12 and 13 of the local circuit are connected to the conductors 6 and 4 of the train-line, respectively, thereby placing the local circuits across the train-line. As the length of the circuit between each local circuit and the generator is the same, equal voltages will be impressed upon the local circuits of the several cars.

The lamp branch of the local circuit is preferably provided with a switch 14, by which the circuit of the lamps may be opened and closed. The local circuit is preferably provided with an automatic switch for connecting the storage battery and the lamps to the generator and disconnecting the same therefrom. The automatic switch may be provided with stationary contacts 15 and 16 and a movable contact 17. The movable contact is preferably carried by a plunger 18, which is actuated by electromagnetic windings 19 and 20. The winding 19 is preferably arranged across the local circuit between the switch-contacts and the train-line, and the winding 20 is preferably arranged in the local circuit in series with the switch-contacts and the storage battery. The shunt-winding 19 will cause the switch to close whenever the voltage of the generator equals that of the storage battery, and while the switch remains closed the series winding 20 will be energized by the current in the local circuit. So long as the generator sends current through the local circuit the series winding will assist the shunt-winding in keeping the movable contacts firmly in engagement with the stationary contacts; but whenever the storage battery sends current through the local circuit, as occurs when the voltage of the generator falls below that of said battery, the series windings will oppose the shunt-winding, and thereby cause the switch to open.

When the generator is in operation, current will flow from the supply-main 7 through conductor 5 and jumper 9 to conductor 4, thence dividingly through the local circuits, and finally it will reunite in the train-line 6 and flow to supply-main 8. This current will flow through the differential field-winding 3, as said winding is arranged in circuit in series with the armature 1. If the voltage of the generator be substantially equal to that of the storage battery, the generator and the storage battery will coöperate in furnishing the current for operating the lamps; but if it be greater than that of the storage battery the generator will furnish the entire current for operating the lamps and in addition it will furnish current for charging the storage battery. It being assumed that the latter condition exists, current will flow in the local circuit of each car from the local main 13 through switch-contacts 15, 17, and 16, thence dividingly through the lamp branch and the battery branch of the local circuit to the local main 12. When the generator becomes inoperative, the automatic switch will open, and thus prevent the storage battery from discharging current onto the train-line, and then the current for operating the lamps will be furnished by the battery. Inasmuch as the current for charging the storage battery will increase in almost direct proportion to the rise in voltage of the generator above the normal voltage of said battery, the differential field-winding 3 will be subject to considerable variations in current upon slight variations in the speed of the armature 1, and in consequence it will be very effective in regulating the generator.

It will of course be understood that the field-winding for regulating the generator may be of various forms and arranged in circuit in various ways to perform its functions.

From the local circuit of each car to one of the terminals of the generator extends a shunt-circuit 21, which passes around the series field-winding 3. Each shunt-circuit is preferably provided with a variable resistance 22, which may be composed of a series of resistance-plates of carbon or other suitable material. These resistance-plates are placed in contact with each other, and the pressure between the same is regulated by an electromagnet 23, which attracts a core 24. The electromagnet 23 is preferably arranged in the lamp branch of the local circuit. The several shunt-circuits are arranged in parallel, and the same divert current from the series field-winding 3, for the purposes which shall hereinafter be set forth.

The current which the generator delivers depends upon the number of cars in the train and the number of translating devices in operation. If the number of cars be increased, the output of the generator will increase, and likewise if the number of cars be decreased the output of the generator will decrease. Moreover, if the number of lamps in operation in any car be increased the output of the generator will increase, and likewise if the number of said lamps be decreased the output of the generator will decrease. The generator will therefore deliver sufficient current to supply all demands. It may be assumed where there are two cars in the train, as illustrated in the drawing, that the generator delivers seventy amperes, thirty-five amperes being distributed to each car. Upon adding a car to the train the output of the generator will increase to one hundred and five amperes, and upon taking one away from the train it will decrease to thirty-five amperes. It may be further assumed that in each car twenty amperes are consumed by the lamps and fifteen amperes are delivered to the storage battery. Upon increasing the number of lamps in operation until thirty-five amperes are consumed thereby the output of the generator will increase until fifty amperes are distributed between the storage battery and the lamps. The current for charging the storage battery will therefore remain fifteen amperes notwithstanding the change in the current consumed by the lamps. Whenever the number of cars in the train is changed, an additional parallel shunt-circuit 21 will be placed around the series field-winding 3 for each car which is added to the train or one of the parallel shunt-circuits 21 will be removed from around said winding for each car which is taken from the train. These changes in the number of parallel shunt-circuits will so change the portion of the output of the generator which is carried around the series field-winding 3 that no substantial change will take place in the current in said winding. Whenever the number of lamps in operation in any car is increased, the current in the electromagnet 23 will increase and then said magnet will cause the resistance 22 to be decreased, and likewise whenever the number of lamps in operation in any car is decreased the current in said magnet will decrease and then said magnet will cause the resistance 22 to be increased. These variations in the resistance 22 will cause the shunt-circuit 21 to so vary the current which is carried around the series field-winding 3 that no substantial variations will take place in the current in said winding. The current in the series field-winding 3 will therefore remain substantially constant so long as the speed of the generator remains constant notwithstanding changes in the number of cars in the train and in the number of lamps in operation in any car. If said winding were subjected to variations in current upon changes in the number of cars in the train, it would cause the resultant strength of the field of the generator to be so altered that the generator would be incapable of delivering sufficient current for a larger number of cars and it would perhaps deliver an excessive current for a lesser number of cars. Moreover, if the differential field-winding were subjected to variations in current upon changes in the number of lamps in any car it would further cause the strength of the field of the generator to be so altered that the generator would be unable to maintain constant current for charging the battery at constant speed.

Having thus described my invention, what I claim, and desire to secure by Letters Patent, is—

1. In a train-lighting system, in combination, a generator driven at a variable speed and having a field-winding so arranged in circuit as to regulate the generator and thereby confine the output thereof within prearranged limits, said winding being arranged in circuit to be subjected to variations in current upon variations in the speed of the armature of said generator, a storage battery and translating devices carried upon each of a plurality of units of the train and connected to said generator, and means for preventing said field-winding from altering the regulation of said generator upon changes in the number of cars in the train and in the number of translating devices in operation in any car.

2. In a train-lighting system, in combination, a generator driven at a variable speed and having a field-winding so arranged in circuit as to regulate the same and thereby confine the output thereof within prearranged limits, said winding being arranged in circuit to be subjected to variations in current upon variations in the speed of said generator, a storage battery and translating devices carried upon each of a plurality of units of the train and connected to said generator, and means for preventing said magnet from being subjected to such variations in current as result from changes in the number of cars in the train and in the number of translating devices in operation in any car.

3. In a train-lighting system, in combination, a generator driven at a variable speed and provided with a shunt field-winding and a differential series field-winding, said differential series field-winding being subjected to variations in current upon variations in the speed of said generator, a storage battery and translating devices carried upon each of a plurality of units of the train, means for automatically connecting said storage battery and said translating devices to said generator and disconnecting the same therefrom, and means for preventing said differential field-winding from being subjected to such variations in current as result from changes in the number of cars in the train and in the number of translating devices in operation in any car.

4. In a train-lighting system, in combination, a generator driven at a variable speed and having a field-winding so arranged in circuit as to regulate said generator and thereby confine the output thereof within prearranged limits, said field-winding being so arranged in circuit as to be subjected to variations in current upon variations in the speed of said generator, a storage battery and translating devices carried upon each of a plurality of units of the train and connected to said generator, and a shunt-circuit extending from each of said units and passing around said field-winding, and means for causing the current in said shunt-circuits to so vary upon changes in the number of cars in the train and in the number of translating devices in operation as to prevent substantial variations in the current in said field-winding.

5. In a train-lighting system, in combination, a generator driven at a variable speed and having a field-winding so arranged in circuit as to regulate the same and thereby confine the output thereof within prearranged limits, said winding being so arranged in circuit as to be subjected to variations in current upon variations in the speed of said generator, a storage battery and translating devices carried upon each of a plurality of units of the train and connected to said generator, a shunt-circuit extending from each of said units and passing around said winding, and means for varying the resistance of said shunt-circuits upon variations in the current consumed by said translating devices.

6. In a train-lighting system, in combination, a generator driven at a variable speed and having a field-winding so arranged in circuit as to regulate the same and thereby confine the output thereof within prearranged limits, said winding being so arranged in circuit as to be subjected to variations in current upon variations in the speed of said generator, a main circuit extending from said generator, a local circuit arranged upon each of a plurality of units of the train, a storage battery and translating devices connected to each local circuit, a parallel shunt-circuit extending from each local circuit to said generator and passing around said field-winding, and means for automatically varying the current in said shunt-circuits upon variations in the current consumed by said translating devices.

7. In a train-lighting system, in combination, a generator driven at a variable speed and carried upon one of the units of the train, said generator being provided with a field-winding so arranged in circuit as to regulate the same and thereby confine the output thereof within prearranged limits, a storage battery and lamps carried upon another unit of the train and connected in circuit with said generator, a shunt-circuit extending from the last-mentioned unit to the first-mentioned unit and passing around said winding, and means for automatically varying the resistance in said shunt-circuit upon variations in the current consumed by said lamps.

8. In a train-lighting system, in combination, a generator driven at a variable speed and carried upon one of the units of the train, said generator being provided with a field-winding so arranged in circuit as to regulate the same and thereby confine the output thereof within prearranged limits, a storage battery and lamps carried upon another unit of the train and connected in circuit with said generator, said storage battery being arranged in one parallel branch circuit and said lamps in another, a shunt-circuit extending from the last-mentioned unit to the first-mentioned unit and passing around said field-winding, a variable resistance arranged in said shunt-circuit, and an electromagnet arranged in the lamp branch circuit and controlling said resistance.

9. In a train-lighting system, in combination, a generator driven at a variable speed and carried upon one of the units of the train, said generator being provided with a shunt field-winding and a differential series field-winding, said differential series field-winding being so arranged in circuit as to be subjected to variations in current upon variations in the speed of said generator, a local circuit arranged upon another unit of the train, a storage battery and lamps connected to said local circuit, said storage battery being arranged in one parallel branch of said local circuit and said lamps in another, a shunt-circuit extending from said local circuit to said generator and passing around said differential series field-winding, a variable resistance arranged in said shunt-circuit, and an electromagnet for controlling said variable resistance, said magnet being arranged in the lamp branch of said local circuit.

10. In a train-lighting system, in combination, a generator driven at a variable speed and carried upon one of the units of the train, said generator being provided with a shunt field-winding and a differential series field-winding, said differential series field-winding being so arranged in circuit as to be subjected to variations in current upon variations in the speed of said generator, a local circuit arranged upon another unit of the train, a storage battery and lamps connected to said local circuit, said storage battery being arranged in one parallel branch of said local circuit and said lamps in another, means for connecting said storage battery and said translating devices to said generator and disconnecting the same therefrom, a shunt-circuit extending from said local circuit to said generator and passing around said differential series field-winding, a variable resistance arranged in said shunt-circuit, and an electromagnet for controlling said variable resistance, said magnet being arranged in the lamp branch of said local circuit.

11. In a train-lighting system, in combination, a generator driven at a variable speed and having a field-winding so arranged in circuit as to regulate the same and thereby confine the output thereof within prearranged limits, said field-winding being so arranged in circuit as to be subjected to variations in current upon variations in the speed of said generator, a storage battery and lamps carried upon each of a plurality of units of the train, a shunt-circuit extending from each of said units to said generator and passing around said field-winding and means for varying the current in said shunt-circuits upon changes in the number of lamps in operation.

12. In a train-lighting system, in combination, a generator driven at a variable speed, and having a field-winding so arranged in circuit as to regulate the same, and thereby confine the output thereof within prearranged limits, said field-winding being so arranged in circuit as to be subjected to variations in current upon variations in the speed of said generator, a storage battery and lamps carried upon each of a plurality of units of the train, said storage battery being arranged in one parallel branch circuit and said lamps in another, a parallel shunt-circuit extending from each of said units to said generator and passing around said field-winding, a variable resistance arranged in each shunt-circuit, and an electromagnet arranged in each lamp branch circuit and controlling the variable resistance upon the unit of the train therewith.

13. In a train-lighting system, in combination, a generator driven at a variable speed and provided with a shunt field-winding and a differential series field-winding, said differential series field-winding being so arranged in circuit as to regulate said generator and thereby confine the output thereof within prearranged limits, a main circuit extending from said generator, a local circuit arranged upon each of a plurality of units of the train and connected to said main circuit, a storage battery and lamps connected to said local circuit, said storage battery being arranged in one parallel branch of said local circuit and said lamps in another, a shunt-circuit extending from each local circuit to said generator and passing around said differential field-winding, a variable resistance arranged in each shunt-circuit, and an electromagnet arranged in the lamp branch of each local circuit and controlling the variable resistance upon the unit of the train therewith.

14. In a train-lighting system, in combination, a generator driven at a variable speed and carried upon the tender of the locomotive, said generator being provided with a shunt field-winding and a differential series field-winding, said differential series field-winding being so arranged in circuit as to regulate said generator and thereby confine the output thereof within prearranged limits, a storage battery and lamps carried upon a car, means for automatically connecting said storage battery and said lamps to said generator, said storage battery being arranged in one parallel branch circuit and said lamps in another, a shunt-circuit extending from said car to said tender and passing around said series field-winding, a variable resistance arranged in said shunt-circuit, and an electromagnet for controlling said variable resistance, said magnet being arranged in the lamp branch circuit.

In witness whereof I have hereunto subscribed my name in the presence of two witnesses.

WILLIAM L. BLISS.

Witnesses:
   J. N. ROBERTSON,
   ANNA M. LYNCH.